(12) United States Patent  (10) Patent No.: US 8,408,613 B1
Tanton  (45) Date of Patent: Apr. 2, 2013

(54) ENERGY ABSORBER FOR AUTOMOTIVE BUMPER

(75) Inventor: Laura L. Tanton, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/275,531

(22) Filed: Oct. 18, 2011

(51) Int. Cl.
*B60R 19/12* (2006.01)
(52) U.S. Cl. .................. 293/109; 293/120; 293/155
(58) Field of Classification Search .................. 293/102, 293/120, 155, 109
See application file for complete search history.

(56) References Cited

U.S. PATENT DOCUMENTS

| 4,066,285 | A | * | 1/1978 | Hall et al. ...................... 293/120 |
| 4,325,574 | A | * | 4/1982 | Umemoto et al. ............ 293/120 |
| 6,485,072 | B1 | * | 11/2002 | Werner et al. ................. 293/132 |
| 7,044,514 | B2 | * | 5/2006 | Mustafa et al. ................ 293/109 |
| 7,201,412 | B2 | * | 4/2007 | Kashiwagi et al. ........... 293/109 |
| 7,537,252 | B2 | * | 5/2009 | Nagai et al. ................... 293/102 |
| 7,980,606 | B2 | * | 7/2011 | Takahashi et al. ............ 293/117 |

* cited by examiner

*Primary Examiner* — Joseph Pape
(74) *Attorney, Agent, or Firm* — Quinn Law Group, PLLC

(57) ABSTRACT

An energy absorber for an automotive bumper assembly having an impact beam includes a first component positioned adjacent the impact beam. The energy absorber also includes a second component positioned such that the first component is disposed substantially between the second component and the impact beam. The energy absorber additionally includes a locking feature configured to join the first component and the second component. A vehicle having a bumper assembly with such an energy absorber is also disclosed.

15 Claims, 4 Drawing Sheets

ENERGY ABSORBER FOR AUTOMOTIVE BUMPER

TECHNICAL FIELD

The disclosure relates to an energy absorber for an automotive bumper assembly.

BACKGROUND

A vehicle bumper is typically the front-most or rear-most component that is attached to the vehicle's body. Such a bumper is generally designed to allow the vehicle to withstand some level of impact without sustaining extensive damage to the vehicle's body or its safety systems.

In most jurisdictions, vehicles are legally required to include bumpers. The height and placement of bumpers may be legally specified as well, to ensure that when vehicles of different heights are involved in an accident, the smaller vehicle will not slide under the larger vehicle.

Typically, vehicular bumpers are not capable of fully absorbing forces that result from high-speed impacts. On the other hand, bumpers are increasingly being designed to deflect and generate less damage to other objects during lower speed impacts.

SUMMARY

An energy absorber for an automotive bumper assembly having an impact beam includes a first component positioned adjacent the bumper impact beam. The energy absorber also includes a second component positioned such that the first component is disposed substantially between the second component and the bumper impact beam. The energy absorber additionally includes a locking feature configured to join the first component and the second component.

The locking feature may include a snap-together arrangement. The snap-together arrangement may have an aperture defined by one of the first component and the second component and a hook element arranged on the other of the first component and the second component. Furthermore, the hook element and the aperture may be configured as complementary features such that the hook element may be inserted and snapped into the aperture. The hook element may be arranged on and integrally molded with the second component. Additionally, the locking feature may include a plurality of snap-together arrangements.

The first component may be formed from a relatively high density foam that is configured to withstand up to a first predetermined level of impact force on the bumper assembly. Furthermore, the second component may be formed from a relatively low density foam that is configured to withstand up to a second predetermined level of impact force on the bumper assembly. The second predetermined level of impact force may be lower than the first predetermined level of impact force.

A vehicle having a bumper assembly with such an energy absorber is also disclosed.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
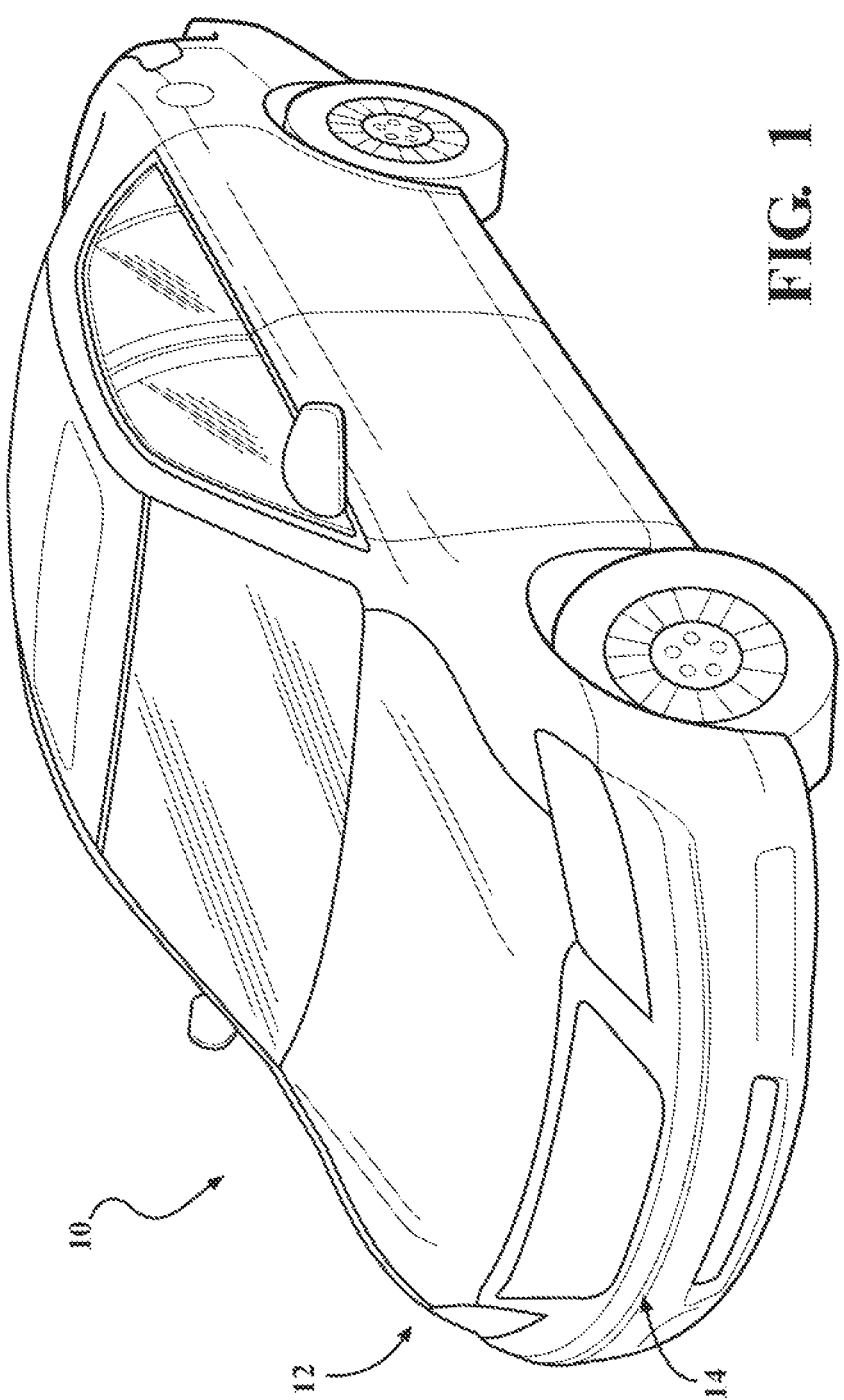
FIG. 1 is a schematic perspective view of a vehicle having a bumper assembly with an energy absorber.
Figure 2:
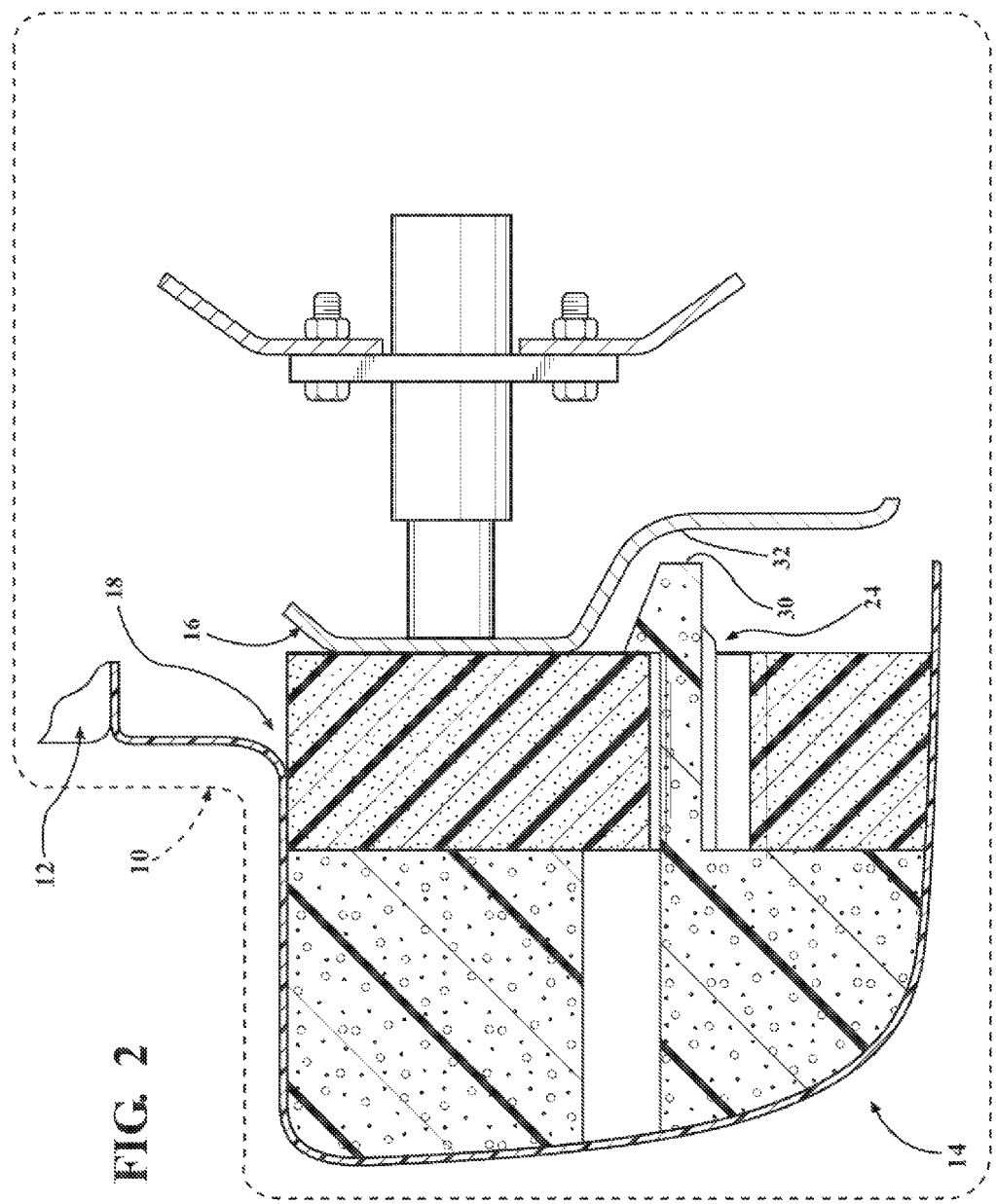
FIG. 2 is a schematic cross-sectional view of the bumper assembly shown in FIG. 1, wherein the energy absorber is illustrated with the first and second components in a joined state.

Referring to the drawings, wherein like reference numbers refer to like components, FIG. 1 shows a vehicle 10 having a vehicle body 12. A bumper assembly 14 is operatively connected to the vehicle body 12. As shown in FIG. 2, the bumper assembly 14 includes a bumper beam 16 and an energy absorber 18. The energy absorber 18 may be attached or connected to the bumper beam 16 by any known method, such as via standard nuts and bolts or straps (not shown). Although only a particular portion of the vehicle body 12 is illustrated with the bumper assembly 14, nothing precludes the bumper assembly from being employed in any location on the vehicle body.

Generally, bumper systems are provided to allow the vehicle to withstand some level of impact without sustaining extensive damage to the vehicle body or the vehicle's safety systems. Vehicular bumper systems are also increasingly being called upon to deflect and generate less damage to other objects during lower speed impacts. As such, the energy absorber 18 is configured to perform a dual role of withstanding impact from a relatively high mass object, such as another vehicle, without significant damage to the bumper assembly 14, as well as yielding during contact with a relatively low mass object.

The energy absorber 18 includes a first component 20 configured to absorb a portion of impact energy incident on the bumper assembly 14. The first component 20 is positioned adjacent the bumper impact beam 16. The first component 20 is formed from a relatively high density foam. The relatively high density foam is configured to withstand up to a first predetermined level of impact force on the bumper assembly 14. The first predetermined level of impact may be indicative of a force that is generated during impact of the vehicle 10 with another vehicle or some physical structure characterized by a mass that is comparable to that of the subject vehicle.

The energy absorber 18 also includes a second component 22 configured to absorb another portion of impact energy incident on the bumper assembly 14. The second component 22 is formed from a relatively low density foam that is more compliant than the relatively high density foam of the first component 20. The relatively low density foam is configured to withstand up to a second predetermined level of impact force on the bumper assembly 14. The second predetermined level of impact force may be indicative of a force that is generated by impact or contact of the vehicle 10 with an object having a mass that is significantly lower than that of the subject vehicle.

The relatively low density foam is more compliant than the relatively high density foam. Accordingly, the second predetermined level of impact force that the second component 22 is capable of withstanding is lower than first predetermined level of impact force that may be withstood by the first component 20. The first and second predetermined levels of impact force may be determined empirically based on impact testing of the vehicle 10 with various simulated and real objects.

Figure 3:
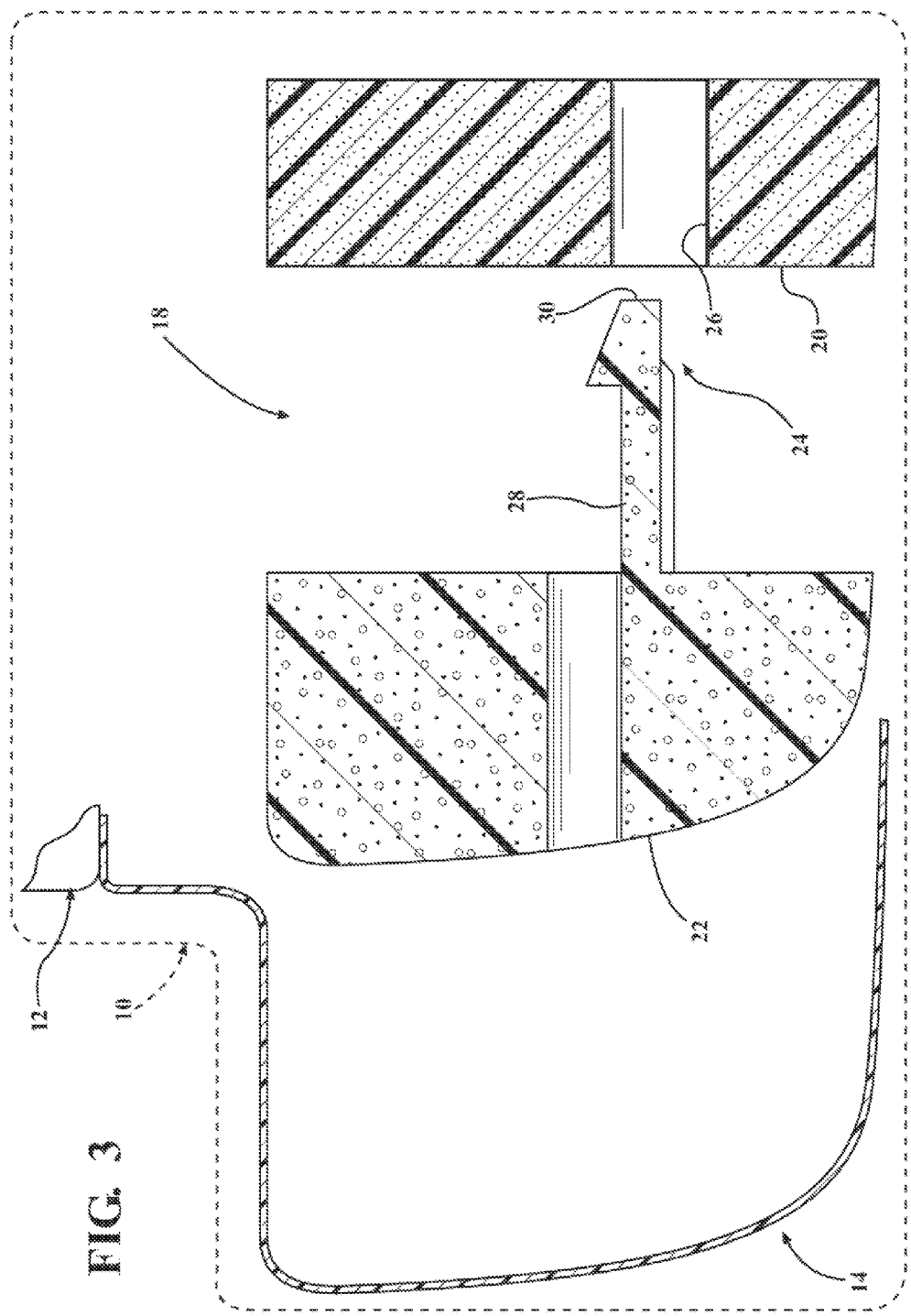
FIG. 3 is a schematic cross-sectional view of the bumper assembly shown in FIG. 2, wherein the energy absorber is illustrated having a first and second component in a pre-joined state.
Figure 4:
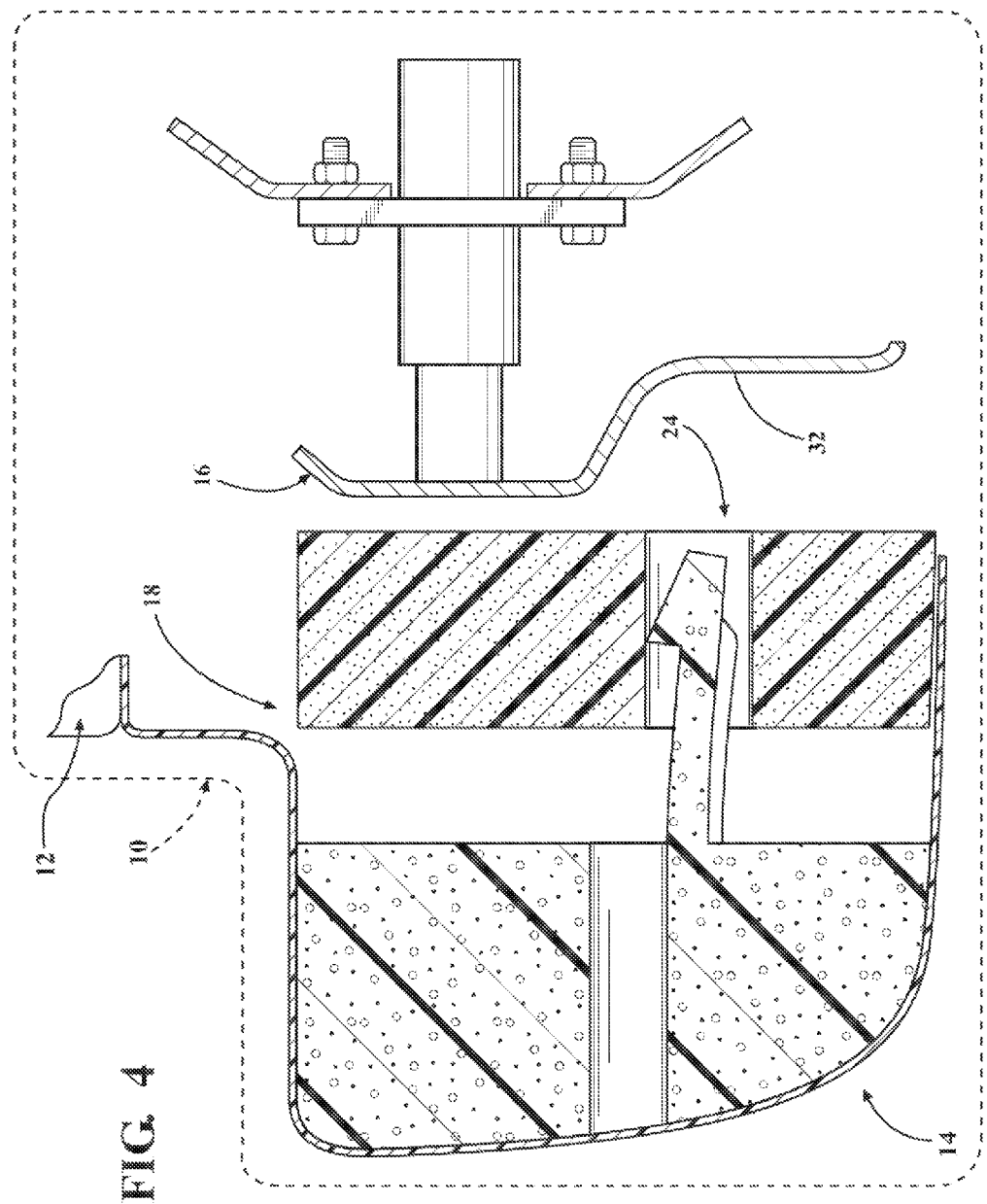
FIG. 4 is a schematic cross-sectional view of the bumper assembly shown in FIG. 2, wherein the energy absorber is illustrated in the process of being joined.

As shown in FIGS. 2-4, the second component 22 is positioned such that the first component 20 is disposed substantially between the second component and the bumper impact beam 16. As additionally shown in FIG. 2, the energy absorber 18 also includes a locking feature 24 configured to join or secure the first component 20 with the second component 22. The locking feature 24 is configured as at least one snap-together arrangement between the first component 20 and the second component 22. As shown, the locking feature 24 includes an aperture 26 defined by first component 20. The locking feature 24 also includes a catch or hook element 28 arranged on the second component 22 such that the hook element is configured to be inserted and snapped into the aperture 26. The locking feature 24 may include a plurality of snap-together arrangements each having the complementary aperture 26 and hook element 28 in order to fix and positively retain the connection between first component 20 and the second component 22.

As additionally shown in FIGS. 2-4, the hook element 28 may be arranged on and integrally molded with the second component 22. The hook element 28 additionally includes a tapered tip 30. The tapered tip 30 is configured as a locating feature that permits assembly of the first and second components 20, 22 in the event less than absolute alignment has been achieved during assembly between the hook element 28 and the aperture 26. Accordingly, as the first component 20 is being assembled with the second component 22 the hook element 28 will be brought into contact with the first component 20 such that the tip 30 engages the aperture 26. Furthermore, as shown in FIG. 4, the hook element 28 may deflect as the tip 30 progresses through the aperture 26 and thereby align the first and second components 20, 22 to achieve the desired final configuration of the energy absorber 18. As shown in FIGS. 2 and 4, the bumper impact beam 16 may include an indented region 32 having sufficient depth in order to clear the tip 30 when the bumper assembly 14 has been put together and installed in the vehicle 10.

During impact of an object with the bumper assembly 14, initially the second component 22 will deflect and absorb the force of the impact. In the event that the impact force exceeds the second predetermined level of impact force, the second component 22 will compress and transmit the impact force to the first component 20. If the hook element 28 is part of the second component 22, as shown in FIG. 3, in the final assembly of the energy absorber 18 the tip 30 protrudes toward the bumper impact beam 16. Such configuration of the second component permits the energy absorber 18 to present a substantially flat or even surface to any object that may impact the bumper assembly 14. On the other hand, if the hook element 28 is part of the first component 20 (not shown), and if presenting a substantially flat or even surface to an impacting object is desired, the second component 22 may require an indented region of sufficient depth where the hook element protrudes through the first component.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An energy absorber for an automotive bumper assembly having an impact beam, the energy absorber comprising:
   a first foam component positioned adjacent the impact beam;
   a second foam component positioned such that the first component is disposed substantially between the second component and the impact beam; and
   a locking feature configured to secure the first component to the second component;
   wherein the locking feature includes a snap-together arrangement having an aperture defined by one of the first component and the second component and a hook element arranged on the other of the first component and the second component such that the hook element is configured to be inserted and snapped into the aperture.

2. The energy absorber of claim 1, wherein the hook element is arranged on and integrally molded with the second component.

3. The energy absorber of claim 1, wherein the locking feature includes a plurality of snap-together arrangements.

4. The energy absorber of claim 1, wherein the first component is formed from a first magnitude density foam that is configured to withstand up to a first predetermined level of impact force on the bumper assembly, wherein the second component is formed from a second magnitude density foam that is configured to withstand up to a second predetermined level of impact force on the bumper assembly, and wherein the second magnitude is lower than the first magnitude.

5. The energy absorber of claim 4, wherein the second predetermined level of impact force is lower than the first predetermined level of impact force.

6. An automotive bumper assembly comprising:
   a bumper impact beam;
   a first foam component positioned adjacent the bumper impact beam;
   a second foam component positioned such that the first component is disposed substantially between the second component and the bumper impact beam; and
   a locking feature configured to secure the first component to the second component;
   wherein the locking feature includes a snap-together arrangement having an aperture defined by one of the first component and the second component and a hook element arranged on the other of the first component and the second component such that the hook element is configured to be inserted and snapped into the aperture.

7. The bumper assembly of claim 6, wherein the hook element is arranged on and integrally molded with the second component.

8. The bumper assembly of claim 6, wherein the locking feature includes a plurality of snap-together arrangements.

9. The bumper assembly of claim 6, wherein the first component is formed from first magnitude density foam that is configured to withstand up to a first predetermined level of impact force on the bumper assembly, wherein the second component is formed from a second magnitude density foam that is configured to withstand up to a second predetermined level of impact force on the bumper assembly, and wherein the second magnitude is lower than the first magnitude.

10. The bumper assembly of claim 9, wherein the second predetermined level of impact force is lower than the first predetermined level of impact force.

11. A vehicle comprising:
    a vehicle body; and
    a bumper assembly operatively connected to the body, the bumper assembly having:
       a bumper impact beam;
       a first foam component positioned adjacent the bumper impact beam;

a second foam component positioned such that the first component is disposed substantially between the second component and the bumper impact beam; and a locking feature configured to secure the first component to the second component;

wherein the locking feature includes a snap-together arrangement having an aperture defined by one of the first component and the second component and a hook element arranged on the other of the first component and the second component such that the hook element is configured to be inserted and snapped into the aperture.

12. The vehicle of claim 11, wherein the hook element is arranged on and integrally molded with the second component.

13. The vehicle of claim 11, wherein the locking feature includes a plurality of snap-together arrangements.

14. The vehicle of claim 11, wherein the first component is formed from a first magnitude density foam that is configured to withstand up to a first predetermined level of impact force on the bumper assembly and the second component is formed from a second magnitude density foam that is configured to withstand up to a second predetermined level of impact force on the bumper assembly, wherein the second magnitude is lower than the first magnitude.

15. The vehicle of claim 14, wherein the second predetermined level of impact force is lower than the first predetermined level of impact force.

\* \* \* \* \*